Oct. 26, 1948.  W. A. JOHNSON ET AL  2,452,521
LOCKING DEVICE FOR TRUCK AND TRAILER DOORS
Filed May 27, 1944
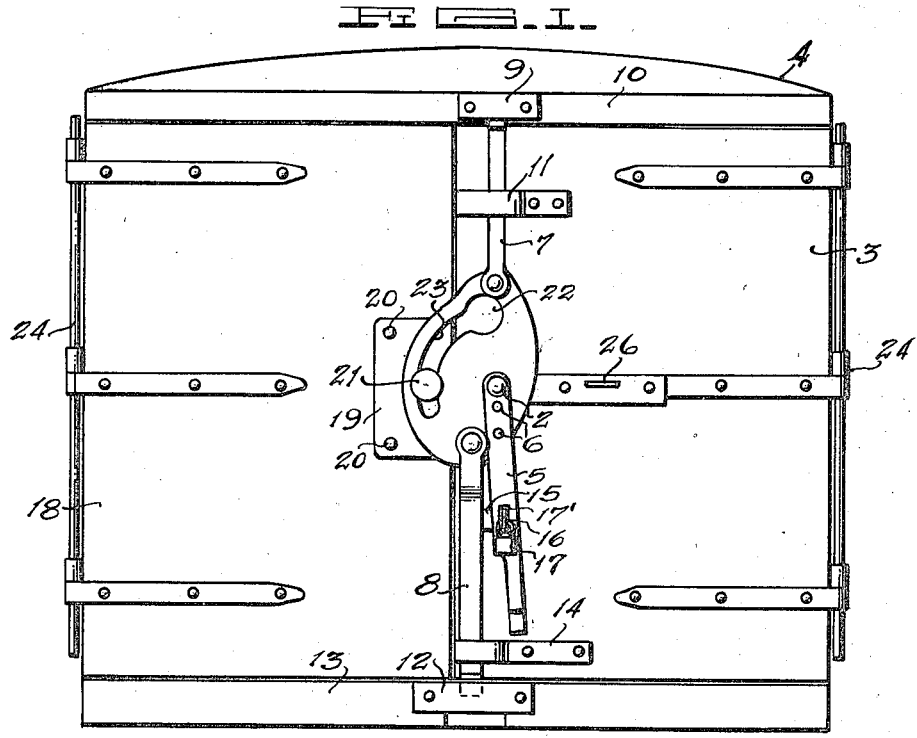
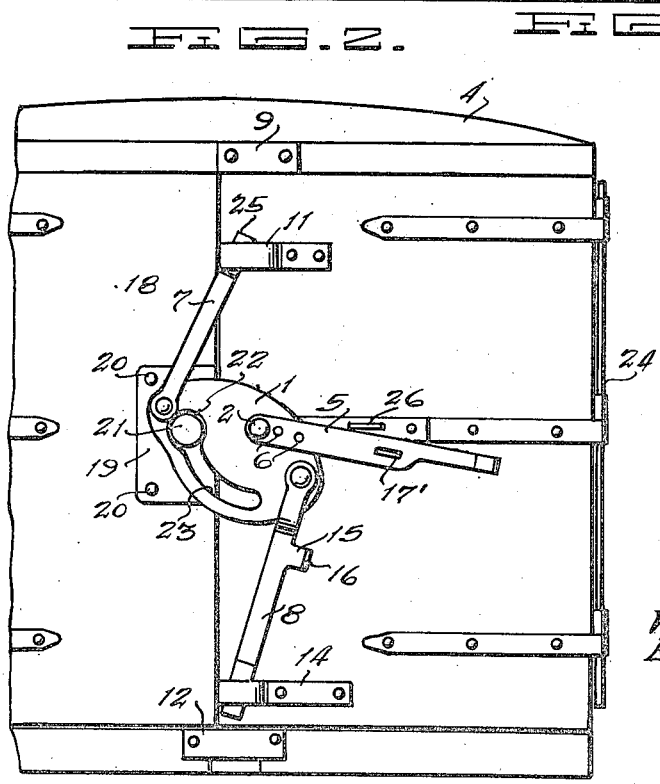
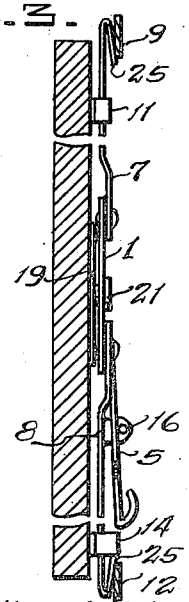
William A. Johnson
Elmer E. Moore
INVENTORS
BY Cecil L. Wood
ATTORNEY Patented Oct. 26, 1948

2,452,521

UNITED STATES PATENT OFFICE 2,452,521

LOCKING DEVICE FOR TRUCK AND TRAILER DOORS

William A. Johnson, Smithfield, and Elmer E. Moore, Fort Worth, Tex.; said Johnson assignor to said Moore Application May 27, 1944, Serial No. 537,636

3 Claims. (Cl. 292—7)

This invention relates to locking devices for truck and trailer doors, or the like, and it has particular reference to locking apparatus designed for use in vans and trucks utilized in highway hauling, such as motor freight, and the like, and its principal object resides in the provision of an arrangement whereby the rear or side doors, of the swinging type, can be securely locked to prevent accidental or unauthorized opening while the vehicle is in transit.

An object of the invention is that of providing a simple locking device capable of easy manual operation and comprising few parts, yet affording adequate protection against theft and the accidental opening of the doors occasioned by the road jars and vibrations transmitted to the vehicle.

A still further object of the invention is manifest in the provision of a locking mechanism embodying such features as a centrally positioned eccentric member capable of rotation on a pivot to cause the extension and withdrawal of latching arms into the header and sill of the vehicle door above and below the swinging doors and securely fasten the same against displacement to any degree and provide a medium whereby a padlock, or other suitable lock, can be utilized to prevent pilferage, or the vehicle may even be sealed, if desired.

Broadly, the invention seeks to comprehend the provision of a locking device of the character described capable of use on all types of vehicle doors, where such vehicles are used in transporting goods, whether such doors be of the double or single swinging type and may be employed as a tail gate latch wherever such a device may be required.

While the foregoing objects are paramount, other and lesser objects will become manifest as the description proceeds, taken in connection with the appended drawings wherein:

Figure 1 is a rear elevational view of a truck showing the invention applied and in locking position.

Figure 2 illustrates the invention in unlatched position on the rear of a truck, or the like, and Figure 3 is a fragmentary vertical cross-sectional illustration of the invention showing the locking arms extending into the keepers and the several pivotal mountings.

Accordingly, therefore, the invention comprises, primarily, an eccentric plate I pivotally secured by a bolt or pin 2 to one of the doors 3 of the vehicle 4. A lever 5 is rigidly secured to the plate I by the bolt 2 and rivets or bolts 6 for rotating the plate I approximately a quarter turn to the left for unlocking, and to the right for locking.

The eccentric plate I is substantially oval in form, although such shape is not necessarily essential to its operation, and has latching arms 7 and 8 pivotally connected to each end, as shown in Figures 1 and 2. The upper arm 7, when in operative position as shown in Figure 1, extends upwardly into a keeper 9 secured in the header 10 of the vehicle door and retained by a guide 11 fixed to the door 3 above the plate I.

The opposite arm 8 depends from the plate I and is adapted to extend downwardly into a keeper 12 in the sill 13 of the vehicle door and is retained in its movement by a guide 14 secured to the door 3 below the plate I. The lower arm 8 is formed with an integral member 15 extending to one side thereof and has its outer end 16 turned outwardly at right angles to the surface of the arm 8 and is apertured to receive a padlock 17, or the like, shown in Figure 1, when the rigid lever 5 is in the position shown in Figure 1 and the slot 17' therein is caused to receive the projecting member 16. The lever 5 has limited flexibility to permit the same to be flexed outwardly sufficiently to cause the projection 16 to enter the slot 17' and secure the assembly against movement once it has assumed the position shown in Figure 1.

On the opposite door 18 a plate 19 is fixed with rivets 20, or other suitable device, and has secured thereto a pin 21 having a large head which is received by a circular opening 22 in the eccentric plate I, in the manner shown in Figure 2, and retains the latter upon the pin 21 in the arcuate slot 23 extending downwardly from the opening 22 when the plate I is in the position shown in Figure 1. It will be observed that while the head of the pin 21 passes through the opening 22, its diameter will not permit its passage through the slot 23. Thus, as soon as the pin 21 enters the slot 23 the doors 3 and 18 are secured together and when the assembly is positioned in the manner shown in Figure 1, and the latching arms 7 and 8 are fully extended into the keepers 9 and 12, the doors are latched securely.

Each of the doors 3 and 18 are provided with suitable hinge assemblies 24 of the conventional type.

The outer ends of the latching arms 7 and 8 are preferably formed so that they are turned back upon themselves providing a wedge 25 or tensioning means for guiding the ends into the keepers 9 and 12 and tightening the doors 3 and 18. This arrangement is illustrated in Figure 3.

A stop 26 is arranged upon the door 3 to limit the upward movement of the lever 5 in the manner shown in Figure 2.

Manifestly the structure herein shown and described is capable of certain changes and modifications by persons skilled in the art and such changes and modifications that may be resorted to and found to fall within the spirit and intent of the invention may also be considered as falling within the scope of the appended claims.

What is claimed is:

1. In a locking device of the character described comprising, in combination, an eccentrically pivoted locking plate adapted for use in cooperation with a keeper member, an arcuate slot formed in said plate and having a circular portion of greater dimension than said slot formed in one end thereof, the said keeper member having a head embraceable by said circular portion of said slot whereby, the said plate when rotated, provides a locking association with said keeper member.

2. In a locking device for closed truck bodies, or the like, the combination comprising an eccentrically pivoted plate having an arcuate slot formed therein with a circular portion on one end, and a rigid lever attached thereto, the said lever extending radially therefrom for rotating the same, a keeper member comprising a stud having a head formed on its outer end embraceable by said circular portion of said slot cooperating with said plate whereby a locked association between said plate and said keeper will result when said plate is rotated, and means for locking said lever.

3. In a locking device for closed truck bodies, or the like, having a pair of doors, the combination comprising an eccentrically pivoted locking plate on one door of said body having a rigid lever attached thereto, an arcuate slot formed in said plate and having an enlarged circular portion in one end, a keeper member on the opposite door comprising a stud having a head cooperating with said plate and engageable with said slot to effect a locked association of said doors when said plate is rotated on said keeper member.

WILLIAM A. JOHNSON.
ELMER E. MOORE.

REFERENCES CITED

The following references are of record in the file of this patent:

UNITED STATES PATENTS

| Number | Name | Date |
|---|---|---|
| 333,093 | Wright | Dec. 22, 1885 |
| 837,811 | Ebbeson | Dec. 4, 1906 |
| 1,090,305 | Hoffman | Mar. 17, 1914 |
| 1,274,758 | Page | Aug. 6, 1918 |
| 1,712,792 | Hansen | May 14, 1929 |